United States Patent [19]
Waters et al.

[11] Patent Number: 5,843,284
[45] Date of Patent: Dec. 1, 1998

[54] TWO-STAGE OIL BYPASS FILTER DEVICE

[75] Inventors: Paul J. T. Waters, P.O. Box 99232, San Diego, Calif. 92169; Scott A. Hahn, San Diego, Calif.

[73] Assignee: Paul J. T. Waters, San Diego, Calif.

[21] Appl. No.: 848,977

[22] Filed: May 2, 1997

[51] Int. Cl.⁶ .............................. C10C 1/20; C10G 17/00; B01D 3/00
[52] U.S. Cl. .................. 196/46.1; 196/115; 196/121; 196/126; 196/128; 210/149; 210/180; 210/181; 210/183; 210/249
[58] Field of Search .................. 196/46.1, 115, 196/121, 128, 126; 210/149, 180, 181, 183, 249

[56] References Cited

U.S. PATENT DOCUMENTS

| | | |
|---|---|---|
| 3,616,885 | 11/1971 | Priest . |
| 3,915,860 | 10/1975 | Priest . |
| 3,998,738 | 12/1976 | Kusay ..................................... 210/180 |
| 4,006,084 | 2/1977 | Priest . |
| 4,115,201 | 9/1978 | Malec . |
| 4,189,351 | 2/1980 | Engel . |
| 4,227,969 | 10/1980 | Engel . |
| 4,272,371 | 6/1981 | Moses et al. . |
| 4,289,583 | 9/1981 | Engel . |
| 4,338,189 | 7/1982 | Johnson, Sr. . |
| 4,349,438 | 9/1982 | Sims . |
| 4,354,946 | 10/1982 | Warlick et al. . |
| 4,369,110 | 1/1983 | Picek . |
| 4,388,185 | 6/1983 | Ott et al. . |
| 4,443,334 | 4/1984 | Shugarman et al. . |
| 4,830,745 | 5/1989 | van der Meulen . |
| 4,943,352 | 7/1990 | Lefebvre et al. . |
| 5,198,104 | 3/1993 | Menyhert ................................. 210/149 |
| 5,242,034 | 9/1993 | DePaul . |
| 5,322,596 | 6/1994 | Arntz . |
| 5,630,912 | 5/1997 | Lefebvre ................................. 196/115 |
| 5,630,956 | 5/1997 | Lynch ..................................... 210/180 |

Primary Examiner—Nina Bhat
Attorney, Agent, or Firm—Richard D. Clarke

[57] ABSTRACT

A new and improved two-stage oil bypass filter device is provided to enable effective and efficient removal of both solid particulate and volatile oil contaminants while also allowing the addition and mixing of certain oil additives as required by specific internal combustion engine or industrial applications. The novel two-stage oil bypass filter device includes a cone-shaped vaporization plate having a heating element located below the surfaces to be heated to provide for more effective and efficient heating of those surfaces critical to removing volatile contaminants, a horseshoe-shaped oil staging channel to provide preheating of the oil, a post-filter flow reducer to greatly reduce the possibility of clogging, a readily replaceable spin-on filter cartridge having a centrally located oil feed tube and an oil diffuser plate which directs the oil to be filtered to all parts of the filter media within the cartridge, an additives package configuration within the filter cartridge for continuous addition and mixing of oil additive substances to the oil being filtered, and a high grade, high impact thermoplastic cap housing to prevent external heating and considerably reduce the potential for burn accidents.

20 Claims, 3 Drawing Sheets

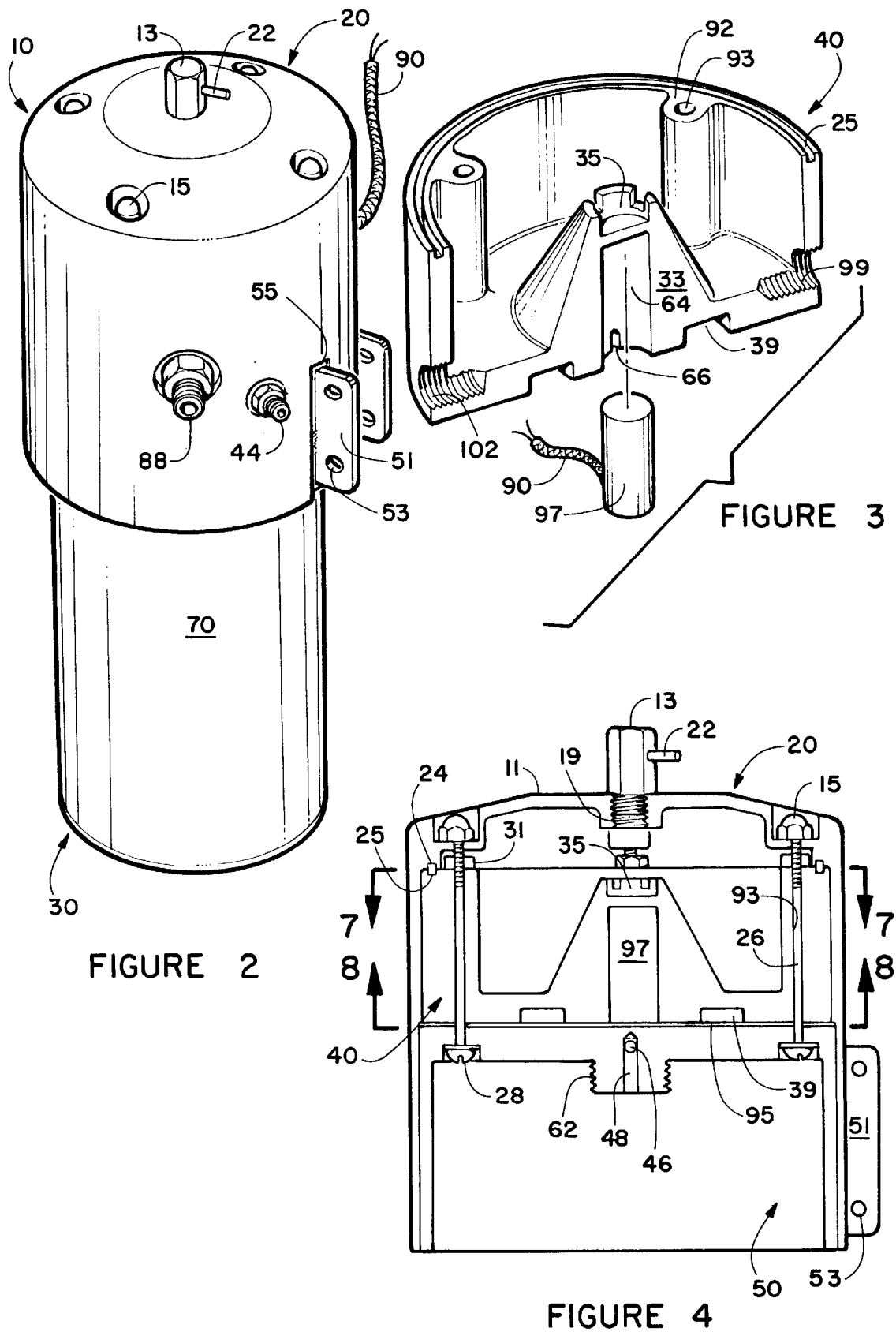

TWO-STAGE OIL BYPASS FILTER DEVICE

BACKGROUND OF THE INVENTION

1. Field of the Invention

The present invention relates to a two-stage oil bypass filter device. More particularly, the present invention relates to a new and improved two-stage oil bypass filter assembly, having a unique evaporation plate and novel filter cartridge for employing electrical energy and mechanical pressure to remove impurities from the oil circulating within internal combustion engines, and other applications.

2. Description of the Related Art

The use of oil reconditioning devices, particularly as employed in internal combustion engines is well known. As an engine functions, the lubricating oil within it is subject to contamination primarily in two forms. First, particulates, including metal particles and carbon particles that accumulate within the oil. Second, volatile liquid contaminants such as water and uncombusted fuel, derived from the combustion process, are continually introduced into the oil as the engine runs or is turned off and cools. For this reason, the oil used to lubricate internal combustion engines is changed often, in some instances as often as every 3,000 miles of travel for the vehicle. This is a very expensive, time consuming, and environmentally unsound practice. Therefore, it would be highly desirable to have a system whereby the lubricating oil would be subject to the removal of contaminants as it is continuously circulating through an internal combustion engine.

Perhaps the most familiar device is the standard full flow oil filter present on all automobile and truck engines. This primary full flow filter device is attached to an engine and the oil flows through it to effect the removal of particulate contamination. While being somewhat effective, this oil filter arrangement does not eliminate the need to change the engine oil on a regular basis because a standard primary full flow filter eliminates only the large particle contaminants from the oil, namely, those particles that are greater than 25 microns in size, and no liquid contaminants.

As an improvement and addition to the standard oil filter, many improved secondary by-pass oil reclamation devices have been invented and patented. Pertinent prior art which is directed toward these oil reclamation devices include U.S. Pat. Nos. 3,915,860, 4,227,969, 4,189,351, 4,289,583, 4,369,110, 4,943,352 and 5,322,569, all incorporated by reference herein. In addition to being mechanical particulate contaminant removing filters, these devices remove volatile liquid contaminants from oil by employing an evaporation plate in various configurations.

In U.S. Pat. No. 3,915,860 an oil reconditioning device is provided with a vaporization plate component and a particulate filtration component. The vaporization plate is heated by electrical power. Oil is forced to flow through the filter component via the inherent oil pressure present in the engine.

The disadvantages of this device include inefficiency in the heating of the vaporization plate. The fact that the filter element is of a case cannister design rather than a spin-on cannister design makes initial mounting and subsequent replacement of the consumable portion of the unit, namely the filter media element difficult. Because the evaporation plate surfaces are not in close proximity to the heating element, much more electrical energy is required to effect vaporization of the volatile contaminants within the oil. Therefore, it would be highly desirable to have an oil reconditioning device with greater ease of mounting and filter replacement, as well as one which operates at greater efficiency with respect to vaporization of volatile contaminants.

U.S. Pat. Nos. 4,227,969, 4,189,351, and 4,289,583 disclose a novel oil reclamation device which attempts to solve these problems. While providing an improved heat transmitting element, and evaporator plate, this oil reclamation unit has several shortcomings. First, the filter unit is of the case cannister design, making it more difficult to install and replace. To effectively replace the filter unit, the top part containing the heating element must be removed first, then the oil diffuser plate must be removed. Additionally, four gaskets must be replaced and properly positioned. Upon removal of the filter unit, two of these four gaskets are located at the very bottom of the cannister housing, submerged in a standing pool of oil. Therefore, it can be a very messy job replacing the filter unit. This makes replacement or repair more time consuming and expensive, and either operation is prone to contaminate the work area with spilled oil.

Second, the evaporator assembly is poorly secured to the filter element by standard wing nuts, and the cannister housing is known to leak oil.

Additionally, while improved, the evaporator plate is still not optimally efficient. The heating element is only partially in contact with the evaporation plate. Only about one quarter of the evaporation plate is efficiently heated through contact with the heating element, with the result that more electrical energy is required to remove volatile contaminants from the oil.

Finally, the oil reclamation devices that are the subject of these three patents employ a pre-filter flow reducer with a circumferential groove through which oil is directed. Because the metering element is encountered by contaminated oil before passing through the filter unit, it is much more prone to clogging.

Therefore, it would be highly desirable to have an oil reclamation device which employed a spin-on cartridge design, an efficient heating element/evaporation plate configuration, and a metering element that was positioned post-filter with respect to oil flow thereby making it much less likely that the metering element would become clogged and require repair or replacement, or any other related type of servicing.

The inventive oil reclamation device described in U.S. Pat. No. 4,943,352 incorporates essentially the same design as the prior art patents discussed above, with the notable improvement that the filter unit employs a spin-on filter cartridge. However, the heating element and evaporation plate configuration is again not optimal as only a small portion of the heating element actually makes contact with the evaporation plate. Additionally, the volume and surface area capacities of the evaporation chamber in this device are inadequate for the oil flow rates expected in most of the applications for which it is employed. As a result, volatile contaminants are not effectively and efficiently eliminated from the circulating oil.

Therefore, it would be highly desirable to have a new and improved two-stage oil bypass filter with an energy efficient heating element/evaporation plate configuration, and an oil additives system incorporated into a spin-on filter design, to enable a continuous introduction of oil additives substances into the circulating oil.

U.S. Pat. No. 4,369,110 teaches an oil filter for use on internal combustion engines having an improved spin-on filter element. Oil is first directed to the base of the filter element then forced upwardly into the filter medium before passing on to the evaporation plate assembly. However, once within the evaporation chamber potentially only a small portion of the oil to be cleaned has the potential to come into contact with the heating element. This design is inefficient because the heating element is very small with respect to the size of the evaporation chamber volume, and the amount of oil expected to be in that chamber at any given time. Moreover, the heating element is not positioned to heat the walls of the chamber in any way, making contact between the oil and the heating element essential in the oil reconditioning process. Even if the diffuser plate was heated directly, it still appears to be too small in proportion to the oil within the chamber to remove volatile contaminants from the oil in an efficient manner. Finally, because of the size of the evaporation chamber housing, this filtration unit would be difficult to install in restricted spaces, such as those encountered in truck engine compartments.

Therefore, it would be highly desirable to have a new and improved oil filtration unit with an efficient heating element/evaporation plate configuration, all in a unit that was compact in size and readily adapted to being installed in tight spaces, namely on truck engines.

The type of inventive oil reclamation device described in, and represented by, U.S. Pat. No. 4,943,352 incorporates a pre-filter metering element or flow reducing element in which the contaminated oil is directed into and through the flow reducing element prior to any contact with the filter media within the filter cartridge. Because the oil encounters the flow reducing element before its passage through the filter, the pressure at which oil enters the filtration unit is considerably reduced.

Thus, it follows that as the filter element becomes clogged with contaminants, the reduced oil pressure lessens the ability of the contaminated oil to fully utilize the total or optimal volume of filter media, and the flow of oil is prematurely reduced.

While the inventive oil reclamation device described in, and represented by, U.S. Pat. No. 5,322,596 incorporates a post-filter metering element or flow reducing element as well, the amount and nature of the filtration of oil is limited by the annular cartridge design and the resultant limited filtration distance inherent in the reclamation device overall is not desirable.

Therefore, it would be highly desirable to have an oil reclamation device which employed a metering or flow reducing element after the contaminated oil passed through the filter cartridge to maintain, to the fullest extent possible, the driving force of the entering oil pressure along with a maximum distance and maximum volume of filter media contacted and utilized in which the contaminated oil would be filtered to remove particulate contaminants.

Finally, all of the prior art devices mentioned above incorporate metal outer housings surrounding the vaporization plate or evaporation chamber mechanism. These outer housings necessarily reach high temperatures of 190 degrees to 250 degrees Fahrenheit during operation as the heating element is mechanically attached to the outer housing itself. As a result, the outer housings get very hot themselves, and as such become a safety hazard. External heated metal housings expose repair and maintenance technicians to the threat of burns.

Therefore, it would be highly desirable to have an oil reclamation device that incorporated a non-heat conducting material into its outer housing to significantly reduce or eliminate the threat of burning individuals performing repair or routine maintenance operations on the device.

SUMMARY OF THE INVENTION

Therefore, the principal object of the present invention is to provide a new and improved two-stage oil bypass filter device having a more effective and efficient heat transfer and vaporization surface configuration as well as a post-filter flow reducing element and an oil preheating staging area.

It is a further object of the present invention to provide such a new and improved two-stage oil bypass filter device that incorporates a filter element that is readily replaced and which directs the flow of contaminated oil throughout the entire filter medium.

It is yet a further object of the present invention to provide such a new and improved two-stage oil bypass filter device in which customized oil additive combinations are readily mixed with oil being simultaneously subjected to the removal of particulate and volatile contaminants, as required by varying applications.

It is yet another object of the present invention to provide such a new and improved two-stage oil bypass filter device having a housing composed of non-heat conducting material to enhance safety.

Briefly, the above and further objects of the present invention are realized by providing a new and improved two-stage oil bypass filter device to enable effective and efficient removal of both solid particulate and volatile oil contaminants while also allowing the addition and mixing of certain oil additives as required by specific internal combustion engine or industrial applications. The novel two-stage oil bypass filter device includes a cone-shaped vaporization plate having a heating element located below the surfaces to be heated to provide for more effective and efficient heating of those surfaces critical to removing volatile contaminants, a horseshoe-shaped oil staging channel to provide preheating of the oil, a post-filter flow reducer to greatly reduce the possibility of clogging, a readily replaceable spin-on filter cartridge having a centrally located oil feed tube and an oil diffuser plate which directs the oil to be filtered to all parts of the filter media within the cartridge, an additives package configuration within the filter cartridge for continuous addition and mixing of oil additive substances to the oil being filtered, and a high grade, high impact thermoplastic cap housing to prevent external heating and considerably reduce the potential for burn accidents.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 2 is a perspective view of the novel two-stage oil bypass filter device when fully assembled showing the filter cartridge attached thereto;

FIG. 3 is a partially exploded sectional perspective view of the vaporization cone component of the novel two-stage oil bypass filter device showing the heating element;

FIG. 4 is a longitudinal sectional view of the head assembly;

DESCRIPTION OF THE PREFERRED EMBODIMENTS

Figure 1:
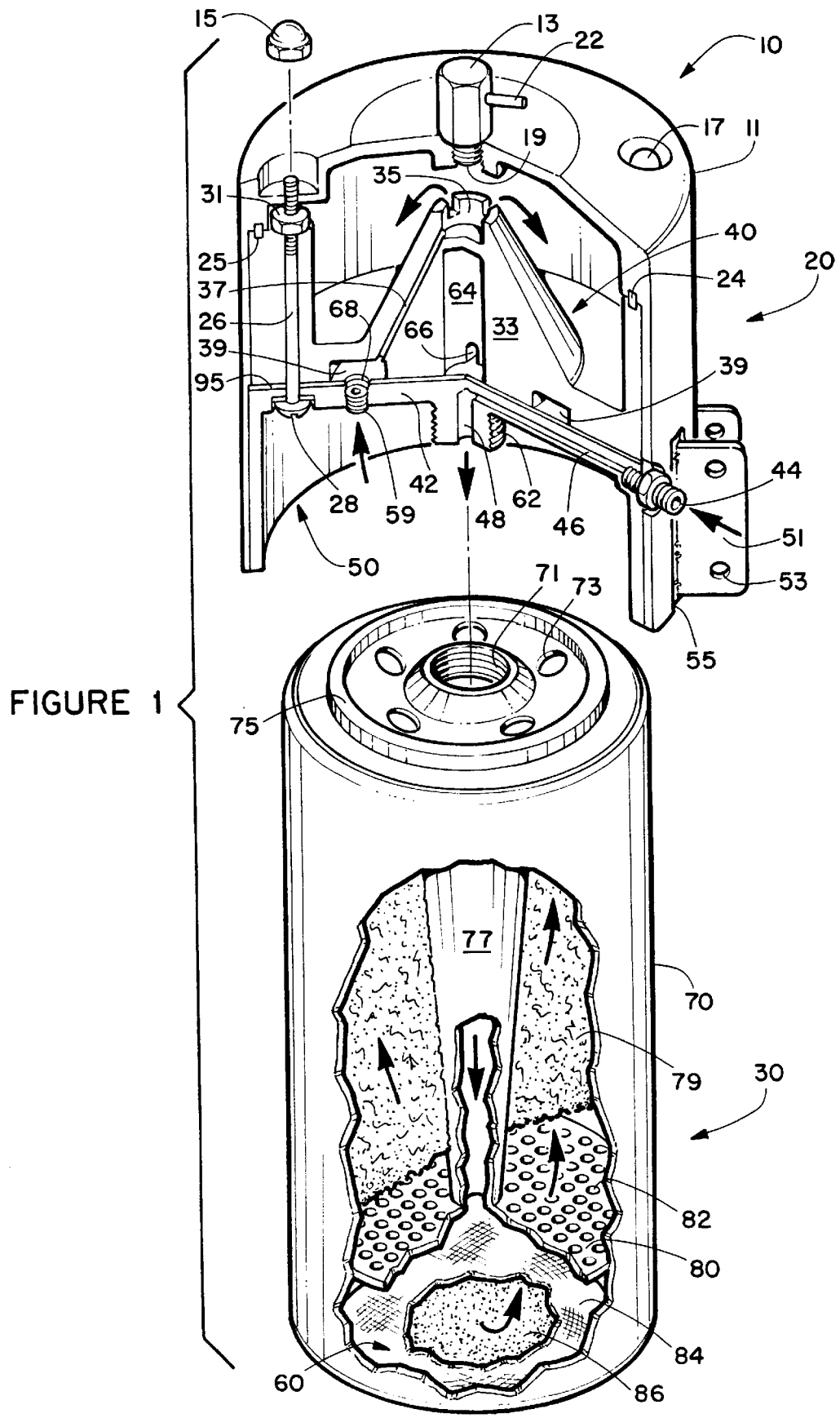
FIG. 1 is an exploded partially cut-away perspective view of the novel two-stage oil bypass filter device with the novel filter cartridge not attached to the novel head assembly.

Referring now to the drawings, and more particularly to FIG. 1 thereof, there is shown a new two-stage oil bypass filter device 10 which is constructed in accordance with the present invention. The novel two-stage oil bypass filter device 10 is used to remove both particulate and volatile contaminants from oil being simultaneously circulated to lubricate an internal combustion engine, for example, a vehicle engine, or other industrial applications in which oil is used to lubricate a machine for instance, and in such applications where oil is circulated and maintained at a certain pressure within a closed system. The novel two-stage oil bypass filter device is mounted in close proximity to the application and oil is sent to and from the filter device unit by way of hoses, pipes or other conduits.

The novel two-stage oil bypass filter device 10 is constructed of two primary assemblies. The first being the head assembly 20, which includes the thermoplastic cap component 11, the vaporization cone component 40, and the base plate component 50. The second being the spin-on oil filter cartridge assembly 30, which includes the oil filter cartridge housing 70 and the additives package 60.

Referring now to FIG. 1 in greater detail, the components making up the head assembly 20 are housed within the thermoplastic cap 11 which is secured to the other components of the head assembly 20 by four dome nuts as represented by dome nuts 15 and 17, positioned within recesses in the thermoplastic cap 11. Within the thermoplastic cap 11, the vaporization cone component 40 and the base plate component 50 are secured together by four threaded bolts as represented by threaded bolt 26. Bolt head 28 lies within a recess in base plate 42, and is exposed for easy unfastening. Four intermediately positioned keps nuts, as represented by keps nut 31, secure the vaporization cone component 40 to the base plate component 50. The keps nut 31 is first threaded onto the threaded portion of the threaded bolt 26 in order to secure the vaporization cone component 40, then the dome nut 15 is threaded onto the remaining threaded portion of the threaded bolt 26 to secure the thermoplastic cap 11.

A threaded aperture 19 on the top surface of the thermoplastic cap 11 allows for the fitting of a vapor valve 13, such as a ball check valve having a vapor outlet 22. Two slots in the construction of the thermoplastic cap 11, as represented by slot 55, allow for the protrusion of two mounting brackets, as represented by mounting bracket 55. The mounting bracket 51 is affixed to the base plate component 50 by a suitable means such as welding, or is cast into the component. Each mounting bracket includes two or more mounting holes, as represented by mounting hole 53, and in this way the head assembly 20 can be securely mounted in an optimal position for operation of the novel two-stage oil bypass filter device. The cap 11 is preferably made of high grade, high impact thermoplastic material for safety reasons, as metal cap materials retain heat and can be a burn danger in repairing or replacing a filter device.

In between the base plate 42 and the vaporization cone 33 is a gasket 95 to provide for a tight seal to prevent any oil from leaking from the head assembly 20. Within an o-ring accepting groove 25 circling around the entire circumference of the upper portion of the vaporization cone component 40, is an o-ring 24 forming a seal between the thermoplastic cap 11 and the vaporization cone component 40 to prevent leakage of oil from the head assembly 20. The gasket 95 and the o-ring 24 are made from suitably heat resistant materials such as heat resistant rubber, cork or other synthetic substances.

In greater detail, the vaporization cone component 40 is made up of single unitary aluminum piece having a center portion shaped like a cone. This vaporization cone 33 has a partially hollow center cavity 64 for accepting an electrical heating element not shown here(see FIG. 3). The electrical heating element is supplied with power through wires within a metal casing (not shown here)that pass through an electrical conduit channel 66.

The lower portion of the vaporization cone component 40 contains a horseshoe shaped oil staging channel 39 which first accepts oil flowing from the flow reducing element 59 through threaded aperture 68. Once the oils staging channel 39 is filled to capacity with oil, the oil travels up through an oil feed passageway 37 to reach the slotted oil reservoir 35 located at the apex of the cone-shaped vaporization cone 33. Oil then uniformly spills through the slots in the slotted oil reservoir 35, in a uniform thin oil film, and down the cone shaped vaporization cone 33, which has been heated by the heating element (not shown).

Before reaching the vaporization cone component 40, the contaminated oil first passes into the base plate component 50 through the oil inlet nipple 44, passing along the horizontal oil inlet channel 46 and down the vertical oil inlet channel 48. With the oil filter cartridge 30 firmly secured to the base plate 66 by threading the female threaded aperture 71 of the filter unit 30, to the threaded portion 62 of the base plate component 50, the oil will then pass into the oil feed tube 77.

The oil feed tube 77 is centrally located within the oil filter housing 70, and is configured in an inverse conical shape. The oil feed tube is integrally connected to the oil diffuser plate 80 which contains numerous small apertures, as represented by aperture 82. Lying in the space below the oil diffuser plate 80 within the oil filter cartridge 30 is the additives package 60, constructed of a sack 84 made of suitable materials, such as natural or synthetic fabrics containing oil additives 86. These additives include certain elemental and chemical substances, including but not limited to silicone polymers, organic copolymers, zinc dithiophosphates, hindered phenols, aromatic amines, sulfurized phenols, or more generally organic complexes containing nitrogen or sulphur amines, sulfides and phosphites, and other oil conditioning substances, which when added to oil protect metal surfaces (bearings, gears, rings, etc.), extend the range of lubricant applicability or extend the life of the oils lubricating capacity. Moreover, certain oil additives can act as emulsifiers, demulsifiers, tackiness agents, bactericides, anti-wear agents, detergents, friction modifiers, dispersants, corrosion and rust inhibitors, seal swell agents, and viscosity modifiers as required by varying internal combustion engine and industrial applications.

After passing through the additives package 60, oil moves through aperture 82 in oil diffuser plate 80 and into the oil filter medium 79. This filter medium 79 is preferably composed of compressed long-strand unbleached cotton fibers, king-strand unbleached cotton fibers, spun cotton fibers or a pleated filter media material. These materials are known to remove particles, ranging from 1 to 3 microns in size, from the oil.

Oil exits the filter cartridge 30 through a plurality of oil filter return ports, as represented by oil filter return port 73. There may be between 5 and 8 or more oil filter return ports located on the upper surface (known as the base plate)of the filter housing 70.

Oil passing from the filter cartridge, exits out the oil filter port 73 and into the oil staging channel 39 of the vaporization cone component 40 through the metering jet or flow reducer 59. This flow reducer 59 is threaded into the base plate 42 within threaded aperture 68, with an equal diameter aperture above it, spanning the gasket 95. The flow reducer 59 has a 0.022 inch or greater flow channel, and acts to govern the overall flow of oil throughout the two-stage oil bypass filter device 10. Flow rates of 3 to 6 gallons per hour are normal for this size and type of flow reducer. Flow rates can be altered, to accommodate differing application conditions or specification requirements by changing the nature of the post-filter metering jet element or flow reducer 59. The filter housing base plate seating gasket 75 maintains an oil tight seal between the oil filter cartridge 30 and the base plate component 50, preventing leakage therefrom.

Figure 5:
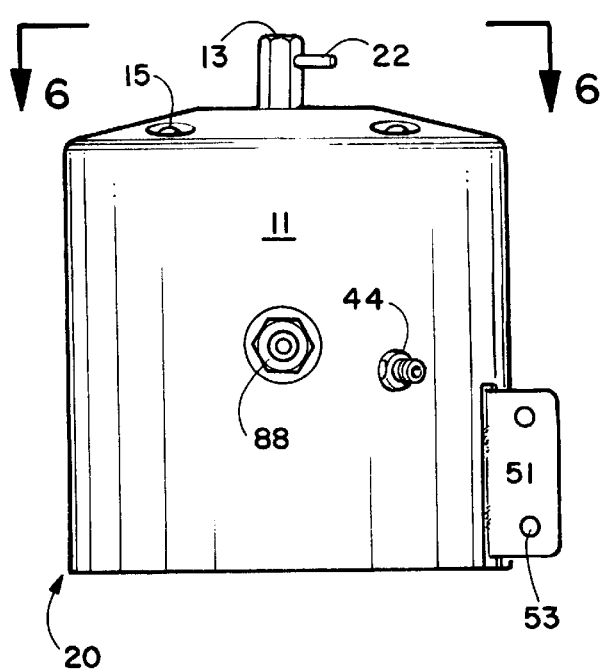
FIG. 5 is a front elevational view of the novel two-stage oil bypass filter device.

Considering now the two-stage oil bypass filter device 10 in greater detail with reference to FIGS. 2, 3, 5 and 6, the head assembly 20 includes an oil outlet nipple 88 which can be positioned in either of two different threaded portions 99 and 102, to provide for versatility in mounting and connecting the entire unit. When the oil outlet nipple 88 is inserted into one threaded portion, either 99 or 102, then the other threaded portion would accept a plug 91. In this way the oil inlet nipple 44 and the oil outlet nipple 88 may be positioned directly adjacent to each other (as shown in FIGS. 2 and 5) or on opposite sides of the head assembly 20 (as shown in FIGS. 7 and 8).

Turning now to FIG. 3, the vaporization cone component 40 is isolated and shown in greater detail. Four bolt thru-holes, as represented by thru-hole 93 are centrally located within four corresponding bolt thru-hole columns integrally molded into the vaporization cone component 40. Heating element 97, provided with electrical power via electrical conduit 90, fits up into cavity 64 to efficiently heat the entire vaporization cone structure 33 from below, which is a significant improvement over the prior art. Two sets of electrical wire pairs run within the electrical conduit, configured to run off of 12/24 volts or 120/220 volts, or any other appropriate voltage applicable to the intended implementation of the device, depending on the application requirements and specifications.

Figure 7:
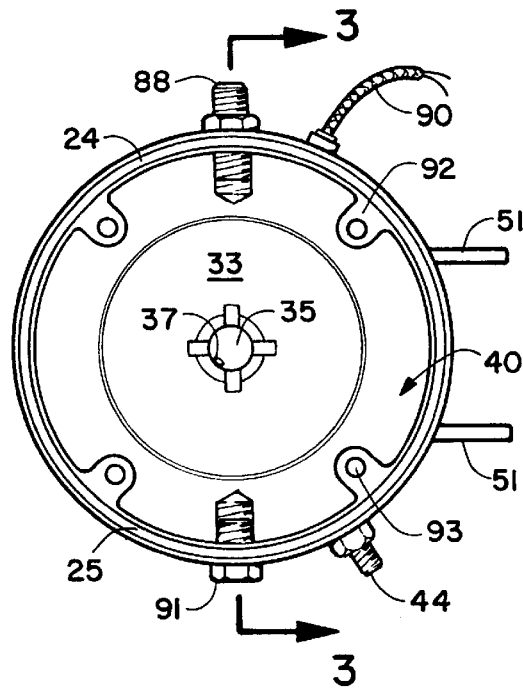
FIG. 7 is a sectional view taken along line 7—7 of FIG. 4.
Figure 6:
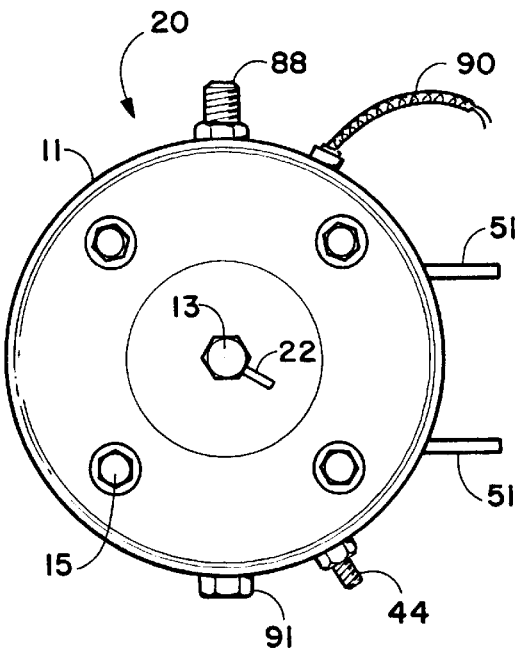
FIG. 6 is a top plan view of the novel two-stage oil bypass filter device.

Turning now to FIG. 7, the oil feed passageway 37 is clearly shown within the slotted oil reservoir 35 at the apex of the vaporization cone 33. The four or more slots formed in the slotted oil reservoir 35 enable the oil to more uniformly cover the heated surface of the vaporization cone 33, even when the unit is in a tilted posture. For example, when a vehicle equipped with the novel two-stage oil bypass filter device is proceeding along a steep grade, the unit is functioning in a tilted posture, yet because oil will spill out of the slots, the oil more uniformly spreads out over more surface area of the vaporization cone. In this way, the novel two-stage oil bypass filter device of the present invention will function far more efficiently in a tilted configuration than any other filter unit described in the prior art.

Figure 8:
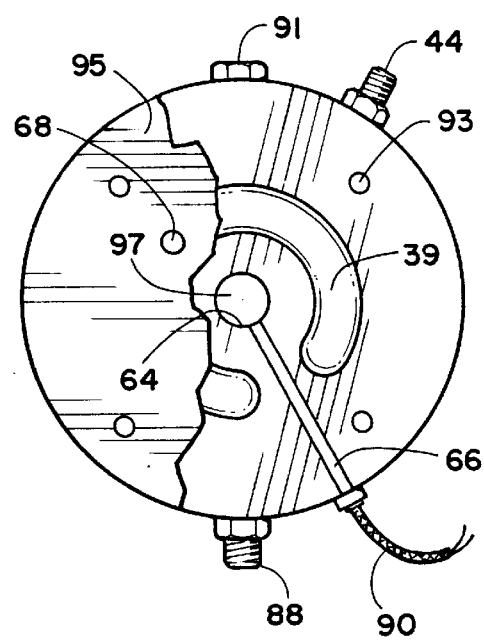
FIG. 8 is a sectional view taken along line 8—8 of FIG. 4.

Considering now the two-stage oil bypass filter device 10 in greater detail with reference to FIGS. 4 and 8, the head assembly 20 is shown with the thermoplastic cap 11 fastened to the tightly secured vaporization cone component 40 and base plate component 50. Mounting brackets, as represented by mounting bracket 51, are cast into the base plate component 50, as a single unitary piece preferably cast in high grade aluminum. Between the base plate component 50 and the vaporization cone component lies gasket 95, having aperture 68 to allow oil to flow from flow reducer 59 into the oil staging channel 39 to be preheated by heating element 97. Plug 91 is shown as a standard hex head bolt plug, but could be replaced with a flush fitting if needed to accommodate installation in restricted space.

In operation, the two-stage oil bypass filter device commences operation by accepting contaminated oil into the oil inlet nipple 44. The oil then travels down horizontal oil inlet channel 46, down vertical oil inlet channel 48, through the oil filter cartridge threaded aperture 71, down through the inverse cone shaped oil feed tube 77 where it penetrates the fabric sack 84 of the additives package 60 and mixes with the oil additives 86 inside. Emerging from the oil additives package 60 with one or more oil additives mixed therein, the oil passes through the apertures 82 of the oil diffuser plate 80 and directly into the filter media 79.

From the filter media, where the oil is cleansed of its particulate contaminants, the oil exits the filter cartridge through the oil return ports 73 where the oil first encounters the post-filter flow reducer 59 which governs the oil flow rate throughout the two-stage oil bypass filter device 10.

Emerging from the flow reducer the oil fills into the oil staging channel 39 in the lower portion of the vaporization cone component 40, where because of contact with heating element 97, the oil begins to increase in temperature. When filled to capacity within the oil staging channel 39, oil is then forced to flow upwards along the oil feed passageway 37 before exiting the passageway 37 at the top of the vaporization cone 33. The oil is in contact with the very hot vaporization cone 33 surface area. The high temperature on the vaporization cone 33 surface is relatively uniform throughout the entire cone surface area. The oil finally flows over the slotted oil reservoir 35 at the apex of the vaporization cone 33, in a thin uniform film of oil. Due to extreme temperatures on the surface of the cone, volatile contaminants within the oil are vaporized and exit through the vapor outlet valve 13. Temperatures typically reach 190 to 220 degrees Fahrenheit on the polished metal surface of the cone.

The thin uniform film of oil which forms on the surface of the cone-shaped vaporization plate 33 enhances the vaporization process. In this way, a maximum efficiency for volatile contaminant vaporization and removal from the oil is achieved. Vaporized volatile contaminants readily exit the device 10 through the vapor outlet valve 13 and the vapor outlet port 22 to be re-combusted, exhausted or recycled. The substantially contaminant free oil then exits the two-stage oil bypass filter device through oil outlet port 88, where it returns by gravity feed to an oil sump to be re-circulated to lubricate parts in the application process, whether it be an internal combustion engine or some other industrial application.

By employing the novel two-stage oil bypass filter device described herein, vehicles in normal operation can expect to extend their oil drain interval to between about 125,000 to 250,000 miles while maintaining the same batch of oil. In the same way, industrial machine tools also greatly extend the life of the circulated oil by approximately 5 to 10 times the normal drain interval. Therefore, while employing this device, rather than routinely changing the oil, only the novel bypass filter cartridge need be changed.

It should be understood, however, that even though these numerous characteristics and advantages of the invention have been set forth in the foregoing description, together with details of the structure and function of the invention, the disclosure is illustrative only, and changes may be made in detail, especially in matters of shape, size, chemistry and arrangement of parts within the principal of the invention to the full extent indicated by the broad general meaning of the terms in which the appended claims are expressed.

What is claimed is:

1. A two-stage oil bypass filter device for removing solid particulate and volatile liquid contaminants from oil, comprising:
    a head assembly for removing volatile liquid oil contaminants including oil inlet means, a singular uniformly smooth surfaced inverted cone-shaped volatile contaminants vaporization means having a horseshoe-shaped oil preheating staging channel means, an oil feed passageway means, heating means located below said vaporization means, oil outlet means, a base plate means having a post-filter flow reducing means, and a non-heat conducting thermoplastic housing means covering said head assembly; and
    a replaceable filter cartridge means removably connected to said base plate means including an oil feed tube means, an oil diffuser plate means, an oil additives permeable container means located below said oil diffuser plate means for adding additives to the flowing oil and oil filter medium means for removing solid oil contaminants from the flowing oil.

2. A two-stage oil bypass filter device for removing solid particulate and volatile liquid contaminants from oil according to claim 1, wherein said cone-shaped vaporization means is removably connected to said base plate means by securing means.

3. A two-stage oil bypass filter device for removing solid particulate and volatile liquid contaminants from oil according to claim 2, wherein said securing means includes threaded bolts affixed to complimentary keps nuts.

4. A two-stage oil bypass filter device for removing solid particulate and volatile liquid contaminants from oil according to claim 1, wherein said base plate means includes a male threaded portion complementary to a female threaded portion of said replaceable filter cartridge for allowing spin-off removal and spin-on replacement of said filter cartridge.

5. A two-stage oil bypass filter device for removing solid particulate and volatile liquid contaminants from oil according to claim 1, wherein said non-heat conducting housing means is removably connected to said cone-shaped vaporization means and said base plate means via securing means.

6. A two-stage oil bypass filter device for removing solid particulate and volatile liquid contaminants from oil according to claim 5, wherein said securing means includes threaded bolts affixed to complimentary dome nuts.

7. A two-stage oil bypass filter device for removing solid particulate and volatile liquid contaminants from oil according to claim 1, wherein said base plate means includes a post-filter flow reducing means removably threaded into a threaded aperture within said base plate means.

8. A two-stage oil bypass filter device for removing solid particulate and volatile liquid contaminants from oil according to claim 1, wherein said non-heat conducting housing means is constructed of high grade high impact thermoplastic material.

9. A two-stage oil bypass filter device for removing solid particulate and volatile liquid contaminants from oil according to claim 1, wherein said cone-shaped vaporization means includes an integral horseshoe-shaped oil staging channel formed within a lower portion of said cone-shaped vaporization means, for preheating oil entering said cone-shaped vaporization means through said flow reducing means within said base plate means.

10. A two-stage oil bypass filter device for removing solid particulate and volatile liquid contaminants from oil according to claim 9, wherein said cone-shaped vaporization means includes an integral oil passageway allowing the flow of oil from said oil staging channel to a top portion of said cone-shaped vaporization means.

11. A two-stage oil bypass filter device for removing solid particulate and volatile liquid contaminants from oil according to claim 10, wherein said cone-shaped vaporization means includes a slotted oil reservoir integrally formed into said top portion of said cone-shaped vaporization means for allowing a uniform thin film of oil to form on the top surface of said cone-shaped vaporization means.

12. A two-stage oil bypass filter device for removing solid particulate and volatile liquid contaminants from oil according to claim 1, wherein said cone-shaped vaporization means includes heating means centrally disposed below said cone-shaped vaporization means, in direct contact with said cone-shaped vaporization means, to provide heat to said cone-shaped vaporization means.

13. A two-stage oil bypass filter device for removing solid particulate and volatile liquid contaminants from oil according to claim 12, wherein said heating means includes an electrically powered heating element.

14. A two-stage oil bypass filter device for removing solid particulate and volatile liquid contaminants from oil according to claim 1, wherein said base plate mean includes mounting brackets affixed to said base plate means for securing said two-stage oil bypass filter device in close proximity to a supply of oil to be decontaminated by said device.

15. A replaceable filter cartridge assembly for use in a two-stage oil bypass filter device, comprising:
    a threaded portion for removably connecting said filter cartridge assembly to a base plate threaded portion of a two-stage oil bypass filter device;
    filter medium means not impregnated with oil additives;
    a centrally disposed oil feed tube means for directing the flow of oil downwardly to a lower portion of said filter cartridge;
    an oil diffuser plate means located in said lower portion of said filter cartridge, integrally connected to said oil feed tube for uniformly directing the flow of oil into said filter medium means; and
    an oil additives permeable container means containing solid oil additives substances located in said lower portion of said filter cartridge, secured below said oil diffuser plate means, for continuous admixing of oil additive substances contained within said permeable container means with oil flowing from said oil feed tube means through said oil diffuser plate means and into said filter medium means.

16. A replaceable filter cartridge assembly for use in a two-stage oil bypass filter device according to claim 15, wherein said filter medium means are composed of materials selected from the group consisting of compressed long-strand unbleached cotton fibers, king-strand unbleached cotton fibers, spun cotton fibers and pleated filter media materials.

17. A replaceable filter cartridge assembly for use in a two-stage oil bypass filter device according to claim 15, wherein said oil diffuser plate means includes a plate containing a plurality of circular apertures.

18. A replaceable filter cartridge assembly for use in a two-stage oil bypass filter device according to claim 15, wherein said oil additives package means includes a sack container means for containing oil additive substances prior to and during mixing with flowing oil.

19. A replaceable filter cartridge assembly for use in a two-stage oil bypass filter device according to claim 18, wherein said sack container means includes a closed sack composed of natural fabric or synthetic fabric.

20. A replaceable filter cartridge assembly for use in a two-stage oil bypass filter device according to claim 15, wherein said oil additives package means includes oil additives substances selected from the group consisting of silicone polymers, organic copolymers, zinc dithiophosphates, hindered phenols, aromatic amines, sulfurized phenols, and organic complexes containing nitrogen or sulphur amines, sulfides and phosphites.

* * * * *